United States Patent
Taniguchi et al.

(10) Patent No.: US 8,068,806 B2
(45) Date of Patent: Nov. 29, 2011

(54) PORTABLE TERMINAL APPARATUS

(75) Inventors: Koji Taniguchi, Kanagawa (JP);
Katsumasa Yamaguchi, Kanagawa (JP);
Akitoshi Mori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 770 days.

(21) Appl. No.: 11/720,546

(22) PCT Filed: Dec. 1, 2005

(86) PCT No.: PCT/JP2005/022078
§ 371 (c)(1),
(2), (4) Date: May 31, 2007

(87) PCT Pub. No.: WO2006/059679
PCT Pub. Date: Jun. 8, 2006

(65) Prior Publication Data
US 2008/0268921 A1    Oct. 30, 2008

(30) Foreign Application Priority Data
Dec. 2, 2004  (JP) ................................ 2004-349782

(51) Int. Cl.
*H04B 1/08* (2006.01)
(52) U.S. Cl. .................. 455/350; 455/575.3; 455/550.1; 455/347; 455/349; 381/151; 381/173
(58) Field of Classification Search .................. 455/903, 455/575.1, 557.3, 575.6, 569.1, 350, 351, 455/575.4, 425, 246.1, 347; 381/326, 380, 381/151, 173
See application file for complete search history.

(56) References Cited

U.S. PATENT DOCUMENTS

| 5,436,625 | A  | * | 7/1995 | Kubo | 341/22 |
| 6,560,468 | B1 | * | 5/2003 | Boesen | 455/569.1 |
| 6,701,166 | B2 | * | 3/2004 | Lim | 455/575.3 |

(Continued)

FOREIGN PATENT DOCUMENTS

JP    2002135380    5/2002

(Continued)

OTHER PUBLICATIONS

"Mobile Products Show Case: TS41 (Sonic Speaker), Released in late Dec. 2003," Jan. 14, 2004, Impress Corporation, <http://k-tai.impress.co.jp/cda/article /showcase_top/17177.html> [retrieved Feb. 3, 2010], 14 pages.

(Continued)

*Primary Examiner* — Kent Chang
*Assistant Examiner* — Magdi Elhag
(74) *Attorney, Agent, or Firm* — Seed IP Law Group PLLC

(57) ABSTRACT

A portable terminal apparatus where a talking can be speedily switched to that using a bone conduction speaker even in the talking. In this device, an upper housing (101) has a cutout section (106) for clearing a step section (103). Installation sections (107) are arranged so as to set the cutout section (106) between them and are combined with a hinge provided in the step section (103). The upper housing (101) can be pivoted and folded relative to a lower housing (102). The lower housing (102) has a keypad (110) and also has the step section (103) formed higher by one step than a panel surface (112) of the lower housing (102). The step section (103) receives a bone conduction speaker (104) and has at its top section a vibration surface (105).

3 Claims, 4 Drawing Sheets

U.S. PATENT DOCUMENTS

| | | | |
|---|---|---|---|
| 6,728,374 B1 * | 4/2004 | Takeda | 379/433.02 |
| 6,914,996 B2 * | 7/2005 | Takeda | 381/380 |
| 6,957,049 B1 * | 10/2005 | Takeda | 455/90.3 |
| 6,999,732 B2 * | 2/2006 | Fukuda et al. | 455/100 |
| 7,196,316 B2 * | 3/2007 | Chan et al. | 250/221 |
| 7,292,695 B2 * | 11/2007 | Kobayashi | 381/151 |
| 7,319,773 B2 * | 1/2008 | Lee et al. | 381/380 |
| 7,460,887 B2 * | 12/2008 | Kobayashi | 455/566 |
| 2003/0059078 A1 * | 3/2003 | Downs et al. | 381/381 |
| 2003/0224832 A1 * | 12/2003 | King et al. | 455/566 |
| 2005/0176459 A1 | 8/2005 | Fukuda | |
| 2006/0079291 A1 * | 4/2006 | Granovetter et al. | 455/563 |
| 2006/0286998 A1 * | 12/2006 | Fukuda | 455/550.1 |

FOREIGN PATENT DOCUMENTS

| | | |
|---|---|---|
| JP | 2003319041 | 11/2003 |
| JP | 2003348208 | 12/2003 |
| JP | 2005175747 | 6/2005 |
| WO | 2004/051967 A1 | 6/2004 |

OTHER PUBLICATIONS

PCT International Search Report dated Jan. 17, 2006.
Communication and Supplementary European Search Report mailed Aug. 10, 2009, issued in corresponding European Application 05811274.

* cited by examiner

PORTABLE TERMINAL APPARATUS

TECHNICAL FIELD

The present invention relates to a mobile terminal apparatus, and more particularly, a mobile terminal apparatus provided with a bone conduction speaker.

BACKGROUND ART

With the rapid widespread use, mobile terminal apparatuses are used under various environments and by people having a wide variety of demands. For this reason, the mobile terminal apparatuses are required to have higher functions and higher performance than ever. One of them is the improvement of call reception performance during a call. For example, there is a strong demand for a mobile terminal apparatus which can be used without trouble under a noisy environment such as crowds in the street and a construction site, and moreover which can also be comfortably used by hearing-impaired people.

Measures are taken for a conventional mobile terminal apparatus such as increasing sound pressure of a voice coil type dynamic speaker used for a receiver or improving the shape of sound holes for pronouncing. However, there is a limit to the method of transmission through air vibration, and therefore, it is proposed to provide a bone conduction speaker. Telephone sets provided with the bone conduction speaker have a long track record in the field of fixed telephones, and they are also becoming widely available in the field of mobile terminal apparatuses in recent years. An example thereof is shown in FIG. 1.

In FIG. 1, reference numeral 11 is an upper case, 12 is a vibration section arranged on upper case 11, 13 is a lower case, 14 is a hinge, and 15 is a sub liquid crystal display device. Vibration section 12 is designed to produce vibration according to a call reception signal by an excitation section such as a piezoelectric body which is provided inside the mobile terminal apparatus. By making vibration section 12 contact a part of a user's head, for example, cheek bone, it is possible to receive speech uttered by a communicating party by means of bone conduction.

One example of such a mobile terminal apparatus using the bone conduction speaker is proposed in following Patent Document 1.

Patent Document 1: Japanese Patent Application Laid-Open No. 2003-348208

DISCLOSURE OF INVENTION

Problems to be Solved by the Invention

However, in order to realize call reception based on a bone conduction scheme with a conventional clamshell mobile terminal apparatus, it is necessary to close the case of the terminal. Therefore, there is a problem that it is difficult to promptly switch from ordinary call reception which is carried out in a state where the case of the terminal is open to call reception using the bone conduction speaker.

It is therefore an object of the present invention to provide a mobile terminal apparatus which can promptly switch to a call using the bone conduction speaker even during a call.

Means for Solving the Problem

The mobile terminal apparatus of the present invention adopts a configuration including: a first case that has a panel surface; a second case that is attached to the first case so as to be movable between a closed state to cover the panel surface and an open state in which a keypad provided on the panel surface is exposed outside to allow the keypad to be used; and a bone conduction speaker that has a vibration surface attached to the first case so as to protrude from the panel surface in the open state and protrude out of the second case in the closed state and produces vibration according to a call reception signal to enable call reception by means of bone conduction.

Advantageous Effect of the Invention

According to the present invention, it is possible to promptly switch to a call using a bone conduction speaker even during a call.

BEST MODE FOR CARRYING OUT THE INVENTION

Now, an embodiment of the present invention will be described in detail with reference to the accompanying drawings.

FIG. 2 to FIG. 4C show the configuration of the mobile terminal apparatus according to an embodiment of the present invention.

The mobile terminal apparatus of the present invention is, for example, a digital mobile terminal apparatus based on a PDC (Personal Digital Cellular) scheme, capable of transmitting/receiving a speech signal and further transmitting/receiving character data such as characters and symbols.

Figure 1:
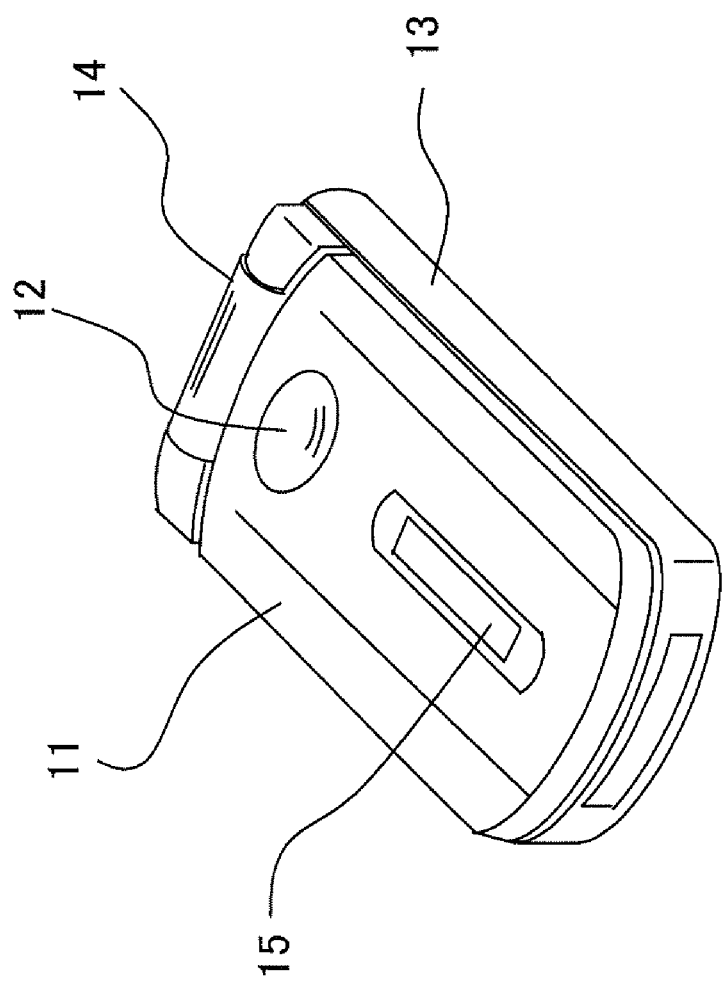
FIG. 1 is a perspective view showing a conventional mobile terminal apparatus.
Figure 2:
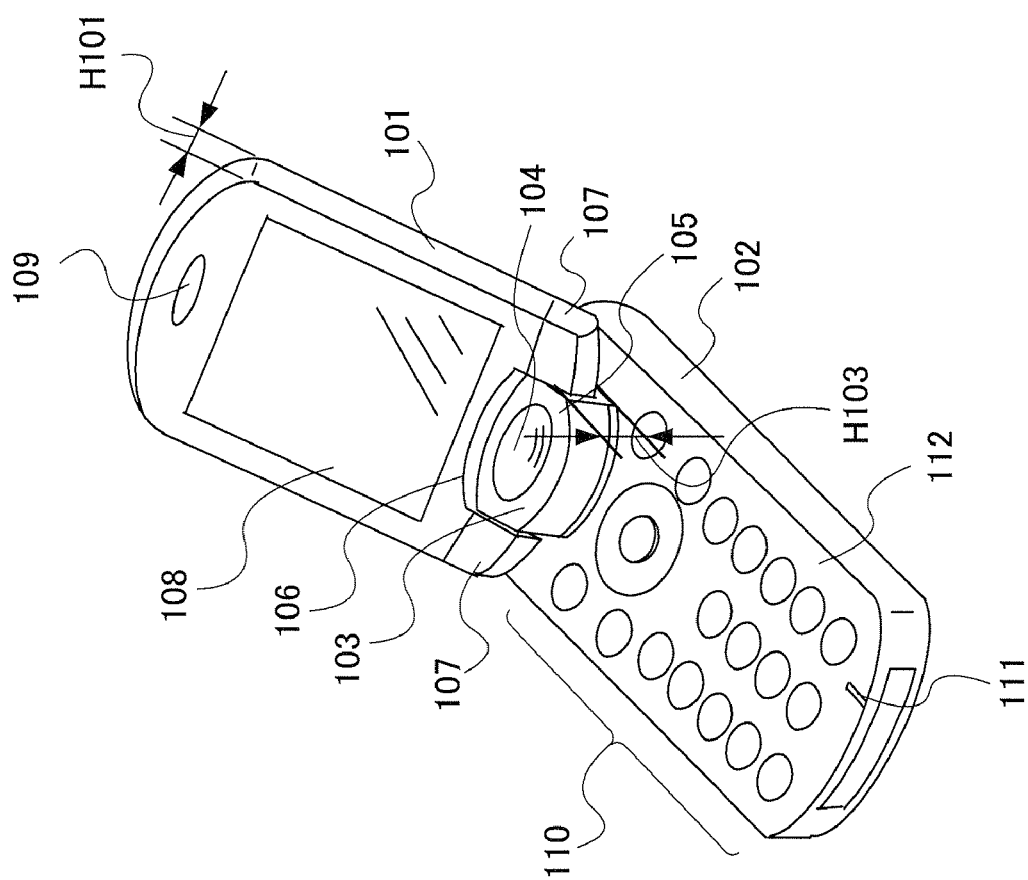
FIG. 2 is a perspective view showing a state in which the case of a mobile terminal apparatus according to an embodiment of the present invention is open.

In FIG. 2, reference numeral 101 is an upper case (second case), 102 is a lower case (first case) provided with a keypad, 103 is a stepped part formed so as to be one step higher than the panel surface of lower case 102, and this stepped part 103 houses a hinge (not shown) to fold upper case 101 over lower case 102 and bone conduction speaker 104. Reference numeral 105 is a flat vibration surface provided on top of stepped part 103, and bone conduction speaker 104 is provided inside stepped part 103 so as to vibrate this vibration surface 105. By making this vibration surface 105 contact the user's cheek bone or the like, call reception is carried out by means of bone conduction.

Upper case 101 is provided with notch 106 to evade stepped part 103, and attachment section 107 provided so as to sandwich notch 106 couples with the hinge provided inside stepped part 103 to allow upper case 101 to pivot with respect to lower case 102 and be folded.

Height H103 of stepped part 103 from panel surface 112 of lower case 102 is greater than thickness H101 of upper case 101.

Furthermore, reference numeral 108 is a main liquid crystal display device provided on upper case 101, 109 is a receiver provided at upper case 101, 110 is a keypad provided so as to be exposed from panel surface 112 which is a top surface of lower case 102, 111 is a transmitter provided at lower case 102. The user makes receiver 109 contact the user's ear to receive a call with voice.

Figure 3:
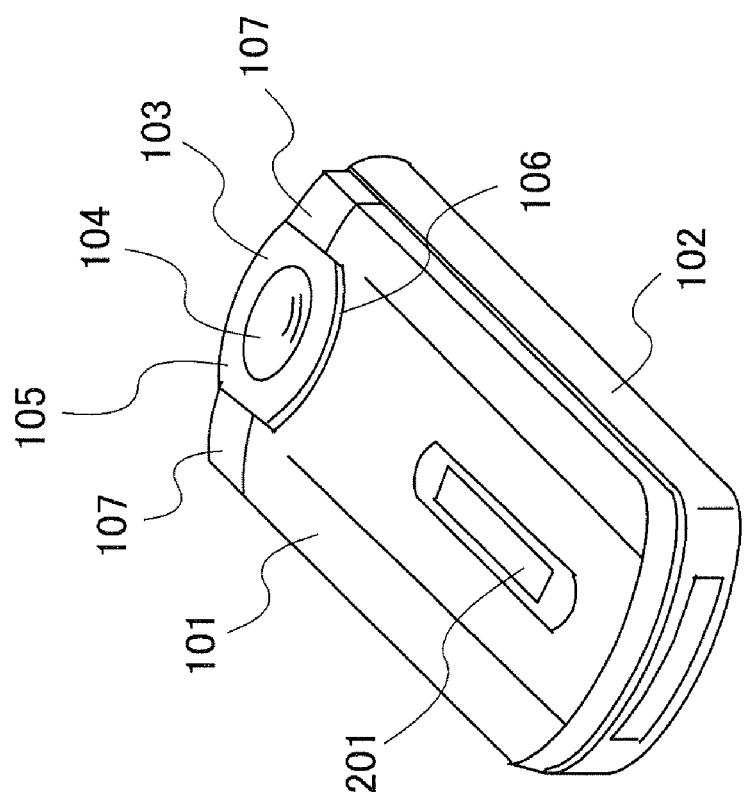
FIG. 3 is a perspective view showing a state in which the case of the mobile terminal apparatus according to the embodiment of the present invention is closed.

The mobile terminal apparatus of the present invention is a so-called clamshell terminal whereby upper case 101 and lower case 102 are allowed to be open and closed with respect to each other using the hinge as an axis of rotation. FIG. 2 shows a state in which the case of the mobile terminal apparatus is open, and FIG. 3 shows a state in which the case of the mobile terminal apparatus is closed. Reference numeral 201 is a sub liquid crystal display device provided on the back of upper case 101.

As shown in FIG. 2 and FIG. 3, vibration surface 105 of stepped part 103 which houses the hinge is exposed outside regardless of whether the case is open or closed and protrudes upward from upper case 101.

Vibration surface 105 of stepped part 103 is provided with bone conduction speaker 104 in contact therewith as the vibration body, and vibration surface 105 is designed to vibrate according to a call reception signal of the mobile terminal apparatus. A piezoelectric element is used for the vibration body in the present invention.

Therefore, call reception is possible based on the bone conduction scheme by making vibration surface 105 of the mobile terminal apparatus contact the user's cheek bone during a call.

Next, a mode in which the mobile terminal apparatus is used will be explained using FIG. 4A to FIG. 4C.

Figure 4A:
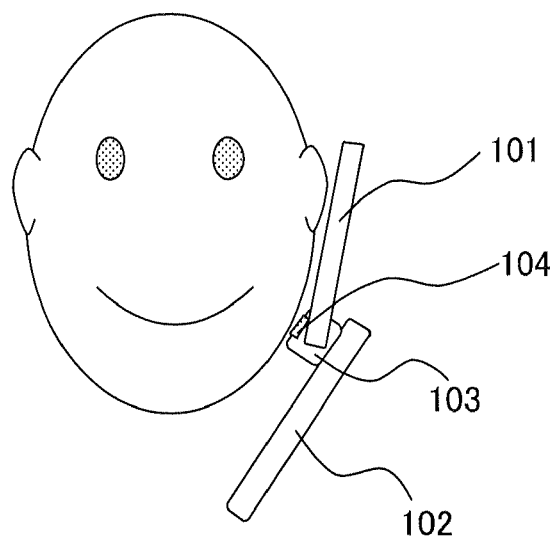
FIG. 4A illustrates a state in which the mobile terminal apparatus according to the embodiment of the present invention is used.

FIG. 4A shows a situation in which the user makes a call by making receiver 109 contact the user's ear in an open state as in the case of a normal mobile terminal apparatus. Receiver 109 is, for example, a dynamic type using a voice coil which produces air vibration. This style of call is carried out under a relatively quiet environment.

Figure 4B:
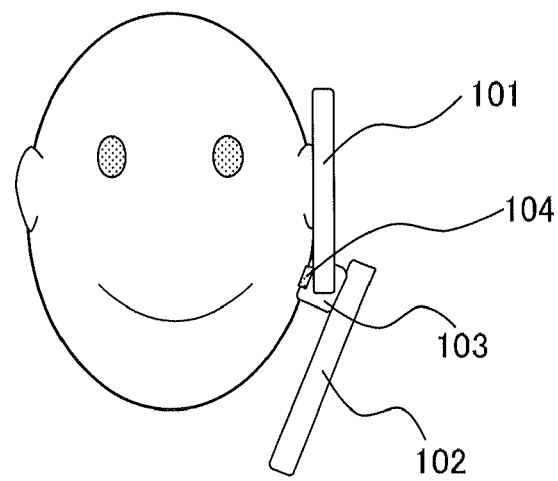
FIG. 4B illustrates another state in which the mobile terminal apparatus according to the embodiment of the present invention is used.

FIG. 4B shows a situation in which the user makes a call by making vibration surface 105 contact the user's cheek bone in an open state. Thus, it is possible to receive a call using bone conduction speaker 104 in a style not so different from that in FIG. 4A. In this way, it is possible to switch to call reception by means of bone conduction using bone conduction speaker 104 during call reception using receiver 109. Therefore, it is possible to immediately switch to a call using bone conduction speaker 104 when surrounding noise becomes louder during the call and it becomes difficult to continue the call using normal receiver 109.

Figure 4C:
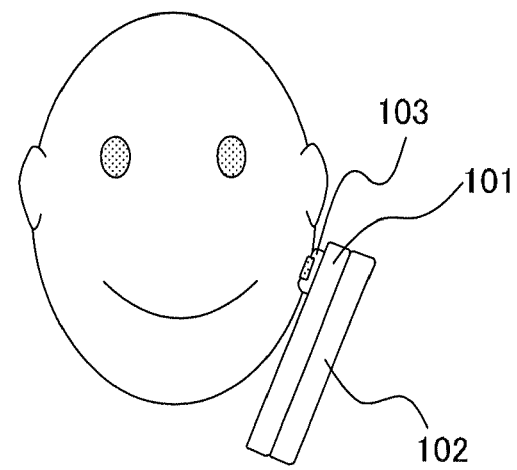
FIG. 4C illustrates a further state in which the mobile terminal apparatus according to the embodiment of the present invention is used.

FIG. 4C shows a case where a call is carried out with the mobile terminal apparatus in a closed state. In this case, call reception using bone conduction speaker 104 is also possible in the same way as in FIG. 4B.

In this way, according to the mobile terminal apparatus of the present invention, by configuring vibration surface 105 of bone conduction speaker 104 so as to be always exposed, it is possible to realize call reception by means of bone conduction regardless of the open or closed state of the case even during a call using receiver 109.

In the above description, an example has been described where a piezoelectric element is used for the vibration body, but this is by no means limiting providing that the vibration body is bone conduction speaker 104 which produces vibration according to a call reception signal, and an electromagnetic excitation type actuator such as a voice coil may also be used. Furthermore, the clamshell terminal having one axis of rotation has been explained here, but a mobile terminal apparatus provided with hinges having two or more axes of rotation may also be used.

Furthermore, the height of stepped part 103 is made greater than the thickness of upper case 101, but this is by no means limiting, and as far as vibration surface 105 has contact with the user's cheek bone, the height of stepped part 103 may be set to the same thickness of upper case 101.

In this way, according to this embodiment, it is possible to promptly switch to a call using a bone conduction speaker even during a call. Furthermore, according to this embodiment, it is possible to carry out a call using a bone conduction speaker for both a state where a normal call is being carried out and a state where the upper case is folded over the lower case and a normal call is not carried out, so that it is possible to improve the ease of use.

In this embodiment, the upper case is overlapped with the lower case as shown in FIG. 3 by causing the upper case and the lower case to pivot around the hinge and folding the upper case over the lower case, but this is by no means limiting, and it is also possible to make the upper case movable by sliding the upper case laterally or the like so as to make the upper case overlapped with the lower case. Furthermore, in this embodiment, notch 106 is provided to evade stepped part 103, but this is by no means limiting, and it is possible to use arbitrary means for evading stepped part 103 such as providing a window hole to evade stepped part 103.

The present application is based on Japanese Patent Application No. 2004-349782 filed on Dec. 2, 2004, entire content of which is expressly incorporated by reference herein.

INDUSTRIAL APPLICABILITY

The present invention is particularly suitable for use in a foldable mobile terminal apparatus.

The invention claimed is:

1. A mobile terminal apparatus comprising:
a first case that has a panel surface with a keypad;
a second case that is attached to the first case so as to be movable between a closed state to cover the panel surface and an open state in which the keypad provided on the panel surface is exposed to allow the keypad to be used;
a receiver that is provided on a front surface of the second case facing the panel surface of the first case and that produces air vibration when receiving a call; and
a bone conduction speaker that has a vibration surface attached to the first case so as to protrude from the panel surface of the first case when the second case is in the open state and to protrude outwardly from a back surface of the second case by way of an opening in the second case when the second case is in the closed state, and that produces vibration according to a call reception signal so that the call is received by means of bone conduction, wherein the mobile terminal apparatus is configured such that, when the received call is in progress during the open state of the second case, the received call is switchable from the receiver to the bone conduction speaker.

2. A mobile terminal apparatus comprising:
a case having a first front surface including a microphone and a second front surface including a receiver that produces air vibration when receiving a call, the first and second front surfaces substantially facing in the same direction; and
a bone conduction speaker coupled to the first front surface of the case, the bone conduction speaker having a vibra tion surface protruding from both the first front surface and the second front surface of the case,
wherein the mobile terminal apparatus is further operable to switch a received call output between the receiver and the bone conduction speaker.

3. The mobile terminal apparatus of claim 2, the vibration surface of the bone conduction speaker includes a piezoelectric element.

* * * * *